United States Patent [19]
Derighetti

[11] Patent Number: 5,565,115
[45] Date of Patent: Oct. 15, 1996

[54] CONTAINER FOR DIELECTRIC FOR ELECTRIC-DISCHARGE MACHINING

[75] Inventor: René Derighetti, Losone, Switzerland

[73] Assignee: AG Für Industrielle Elektonik, Losone Bei Locarno, Switzerland

[21] Appl. No.: 347,452

[22] PCT Filed: Apr. 6, 1994

[86] PCT No.: PCT/EP94/01061
    § 371 Date: Dec. 5, 1994
    § 102(e) Date: Dec. 5, 1994

[87] PCT Pub. No.: WO94/22627
    PCT Pub. Date: Oct. 13, 1994

[30] Foreign Application Priority Data
    Apr. 6, 1993 [DE] Germany ............ 43 11 302.8

[51] Int. Cl.$^6$ .................. B23H 1/00; B23H 11/00; B23H 1/10
[52] U.S. Cl. .................. 219/69.11; 219/69.14
[58] Field of Search ............. 219/69.11, 69.14, 219/69.17; 204/129.7, 204 M; 205/670, 671, 672, 666

[56] References Cited

U.S. PATENT DOCUMENTS

| | | | |
|---|---|---|---|
| 3,399,125 | 8/1968 | Mikoshiba et al. | 205/672 |
| 3,409,535 | 11/1968 | Ross et al. | 204/224 M |
| 3,541,290 | 11/1970 | Isarie | 219/69.14 |
| 3,711,676 | 1/1973 | Witzel | 219/69.14 |
| 4,208,256 | 6/1980 | Inoue | 219/69.14 |
| 4,361,745 | 11/1982 | Rupert et al. | 219/69.13 |
| 4,367,400 | 1/1983 | Otto et al. | 219/69.14 |

FOREIGN PATENT DOCUMENTS

| | | | |
|---|---|---|---|
| 1565371 | 7/1971 | Germany | 219/69.11 |
| 755900 | 8/1980 | U.S.S.R. | 219/69.11 |

*Primary Examiner*—Geoffrey S. Evans
*Attorney, Agent, or Firm*—Cohen, Pontani, Lieberman, Pavane; Christa Hildebrand

[57] ABSTRACT

An electric discharge machine is shown with a work piece (4) inside a hermetically closed container (13) having a dielectric capable of being supplied and removed in particular under pressure, the container (12) has at least two parts (6, 14a, 14b, 14c) capable of sliding on each other. In particular, the parts are designated as telescopically nestable rings (14). At least two parts are further interconnectable and detachable from each other by a quick acting system.

15 Claims, 6 Drawing Sheets

CONTAINER FOR DIELECTRIC FOR ELECTRIC-DISCHARGE MACHINING

FIELD OF THE INVENTION

The present invention relates to a device for electric-discharge machining of a work piece positioned in an all-enclosing container for a dielectric supplied and extracted subject to pressure.

DISCUSSION OF THE PRIOR ART

The state of the art is represented by DE AS 1 294 162 and AS 1 139 359, by H. Opitz, Modell für die selbsttätige Prozessoptimierung bei der funkenerosive Bearbeitung, Industrie-Anzeiger 93, 87(Oct. 19, 1971), pp. 2169–70, and by R. Kurr, Adaptive Control-Systeme für die Funkenerosion, VDI-Z 115, 10(Jul. 1973), pp. 848–53).

The particular dielectric employed in electric-discharge machining extensively determines how many particles are eroded from the work piece, how precisely and satisfactorily it can be machined, and how rapidly the electrodes wear out. The rinse insulates the die sinker and the work piece, increases the effective density at the site of erosion, keeps the electrode and work piece cool, and flushes away the particles eroded.

Dielectric rinsing can be carried out in various ways, especially in electric-discharge machining with a die sinker. Eroding particles from a die sinker in a container open at the top or entirely enclosed and partly or entirely occupied by a dielectric fluid for example is known. Depending on what type of machining is desired (e.g. rough, fine, or very fine), on the geometry of the work piece and electrode, and on what dielectric is employed, the rinse can be applied subject to gravity, pressure, or suction, by displacement (e.g. rinsing the electrode), or by a combination thereof.

To ensure effective rinsing the dielectric is filtered of particles eroded from both electrodes, the work piece and the die sinker that is, and cooled in a filter. Compression and suction pumps convey the dielectric into and out of the container.

Exposing the rinse to, or supplying it subject to, high pressure while the work piece is being roughed out and relatively coarse particles are being eroded is recommended. The dielectric container must for this purpose entirely surround the site of erosion to an extent that will ensure the level of pressure necessary for eroding particles. To accelerate the erosion, that is, the density of flow is increased, which in turn accelerates the flow of dielectric in the operating gap.

FIGS. 5a through e are schematic illustrations of known electric-discharge machines and of various known rinsing devices and containers wherein the rinse is conveyed through the operating gap subject to pressure. FIG. 5a is a section through an electric-discharge machine, whereby the die sinker is eroding in an open container. FIG. 5b illustrates a machine wherein the dielectric is conveyed subject to pressure through a line in the die sinker. FIG. 5c illustrates suctioning the dielectric out through a line in the electrode. FIG. 5d illustrates suctioning the dielectric out through a line in the work piece. FIG. 5e illustrates supplying the dielectric through a line in the work piece.

The rate of flow of the dielectric must be maintained as constant as possible to maintain machining results and surface quality as constant as possible. In die sinker erosion it is accordingly of particular advantage to pump the dielectric into the container from outside in order to maintain an adequate and constant rate.

FIGS. 6a and 6b illustrate a known electric-discharge machine wherein the work piece and the die sinker are accommodated in a completely enclosed pressurized vessel or hermetically sealed container. The dielectric is extracted from the site of erosion and from the container through the die sinker as illustrated in FIG. 6a or through the work piece as illustrated in FIG. 6b.

The container comprises two halves. The first, a sort of hood, is forced against the second, the base, by a force K. The machinery must apply enough force K to seal the container. A sleeve extends through the ceiling of the container, and the work piece can be machined by lowering the electrode in the direction indicated by arrow Z.

Although the resistance to pressure of the known container has been proven, machining in the X and Y directions is possible only to a very limited extent if at all. To machine in these directions it is accordingly necessary to take time to remove the hood from the pressurized container and proceed in an exterior tub-like container that is open at the top. To resume machining "subject to pressure" the container must be reattached to the electric-discharge machine.

The invention is intended to eliminate these problems.

SUMMARY OF THE INVENTION

This object is attained in a generic device in accordance with the present invention in that the container has at least two components that slide back and forth along each other.

In contrast to the state of the art, the ability of these components to slide along each other renders the container easy to open and close even automatically. This feature in turn allows rapid and uncomplicated changeover between machining with a dielectric supplied under pressure (with the container sealed and with machining only in the Z direction) and machining with the dielectric supplied without pressure in an open container along three or more axes subject to planetary controls.

At least two and especially three of the sliding components in a particularly preferred embodiment of the invention are telescoping. The container in this embodiment comprises for practical purposes an upper half in the form of a telescoping arrangement that rests on and is attached to a base. The telescoping arrangement consists of several components that slide back and forth along (and in this case into and out of) one another. The centers of the components are aligned along the axis of the telescoping arrangement. The container is opened and closed by extending and collapsing the telescoping arrangement. A particular advantage of the telescoping arrangement principle is that the components occupy little space when the container is open. A telescoping arrangement is also particularly easy to open and close automatically. It is accordingly possible by appropriately designing the electric-discharge machine with another open container outside the container that can be sealed to change completely automatically between machining with and without a pressurized container. While the telescoping arrangement is collapsed and the container is accordingly open, machining can be carried out along all available axes. To resume operating subject to pressure, the telescoping arrangement is simply extended and the container closed by attaching the telescoping arrangement to the base, a holder or bench for example.

The two halves in another especially advantageous version of the invention can be attached to and detached from each other by means of rapid attachment. The means of rapid attachment in embodiment of this version comprise bayonet fasteners that secure the base to the lowest and outermost component of the telescoping arrangement. Means of rapid attachment and especially bayonet fasteners are easy to manufacture and allow rapid and simple management of the container. It is preferable for the bayonet fasteners to be mounted on the lowest and outermost component of the telescoping arrangement and to engage inside one or more slots in the base. The attachment is established and disestablished by sliding the lowest and outermost component around the base.

The sliding components in an especially preferred embodiment are components of a telescoping arrangement that slide axially in and out of each other. The inside diameter of one such component will equal the outside diameter of one or more sleeves or an extension thereof on the electric-discharge device. That component is in turn surrounded by one or more and especially by two additional telescoping arrangement components, providing the container in the closed state with the form of a terraced cone. This container can be satisfactorily adapted to the size and shape of an extremely wide range of electric-discharge devices. The invention is accordingly highly appropriate for refitting existing electric-discharge machines.

A container with an upper half in the form of a telescoping arrangement can be practically embodied in many ways. It is preferable to fit an uppermost and innermost telescoping arrangement component at its inner surface around a sleeve on the electric-discharge device. The joint between the telescoping arrangement and the base is provided with the means of rapid attachment. The container is opened by initially releasing the means of rapid attachment. The telescoping arrangement is then collapsed upward. The telescoping arrangement components will accordingly in a very practical way be positioned on the electric-discharge machine where they will in no way impede machining in the X and Y directions while the container is opened (without the rinse being supplied subject to pressure as conventional).

The inner surface of the uppermost and innermost telescoping arrangement component in another embodiment preferably slides up and down along the sleeve. The work piece travels back and forth in the Z direction in another advantageous version and the container can accordingly be opened and closed by raising and lowering the base. The base accordingly moves relative to the telescoping arrangement (and accordingly "along" it in the sense of the present invention).

The components of the telescoping arrangement in another especially preferred embodiment have radial flanges. The flanges make it possible to increase the size of the container with only a few components and accordingly to accommodate it in very tight places.

It is particularly preferred for the components of the telescoping arrangement to comprise an axial cylindrical section with a flange extending radially out at one end and another flange extending radially in at the other. It is preferable for the uppermost and innermost telescoping arrangement component to have another cylindrical section extending axially up from the inner edge of its upper flange and fitting around the sleeve. The individual telescoping arrangement components are particularly easy to seal off from each other in a design of the present invention in accordance with one or both of the embodiments just described. It is particularly preferable for the step-like telescoping arrangement components to be provided with one or more seals at or near the inner and/or outer edges of the flanges.

The lowest and outermost telescoping arrangement component is secured to the base component.

The seal at the outer edge of the lower and radially outward flange on each telescoping arrangement component in another preferred embodiment seals that edge off from the inner surface of the cylindrical section of the next lower and outer telescoping arrangement component. The seals in this event are in a practical way positioned to allow enough pressure for rinsing under pressure to become established in the compartment without detriment to the telescoping ability of the components.

Another advantageous version of the invention features a safety valve and/or stopcock for depressurizing the container in the wall of one component of the telescope. The valve or comparable safety device is preferably integrated into the overall safety and monitoring components of the electric-discharge device.

Further improvements and advanced versions of the present invention can be attained by the following measures. The device can have a pulse and/or current generator and a device for detecting potential and current in the operating gap and a data processor for determining electrode advance and adaptively adjusting the generator parameters to optimize machining whereby the controls can be designed to adaptively adjust and select the flow rate of the dielectric through the dielectric pump to optimize machining. The employment of these devices and accessories simplifies operation and optimizes possible applications for the invention without making it more complicated for the user. It is, rather, possible to extensively automate the application of the various options as a part of overall development at the factory. The generator can in particular be designed as a direct-current generator with appropriately controls to erode particles with a stationary arc.

The dielectric rinse, finally, can be supplied to and extracted from the site of erosion very simply in accordance with the present invention through the die sinker or through one of the subsidiary components.

Another advantageous version of the invention has a throttle for adjusting the pressure at the exit from the operating gap. The throttle allows adaptive adjustment of the pressure at the exit from the operating gap, ensuring controlled discontinuation of the erosion arc.

In summary, the present invention allows particularly rapid and simple changeover between machining the work piece with and without rinsing the operating gap subject to pressure. Machining will accordingly take much less time than it does with conventional electric-discharge devices, and machining can be further automated.

Additional advantages and preferred characteristics of the present invention will be evident from the following specification of preferred embodiments. These examples are illustrated schematically in the accompanying drawing, which also illustrate the difference between devices in accordance with the present invention and those in accordance with the state of the art.

DESCRIPTION OF THE PREFERRED EMBODIMENT(S)

Figure 1:
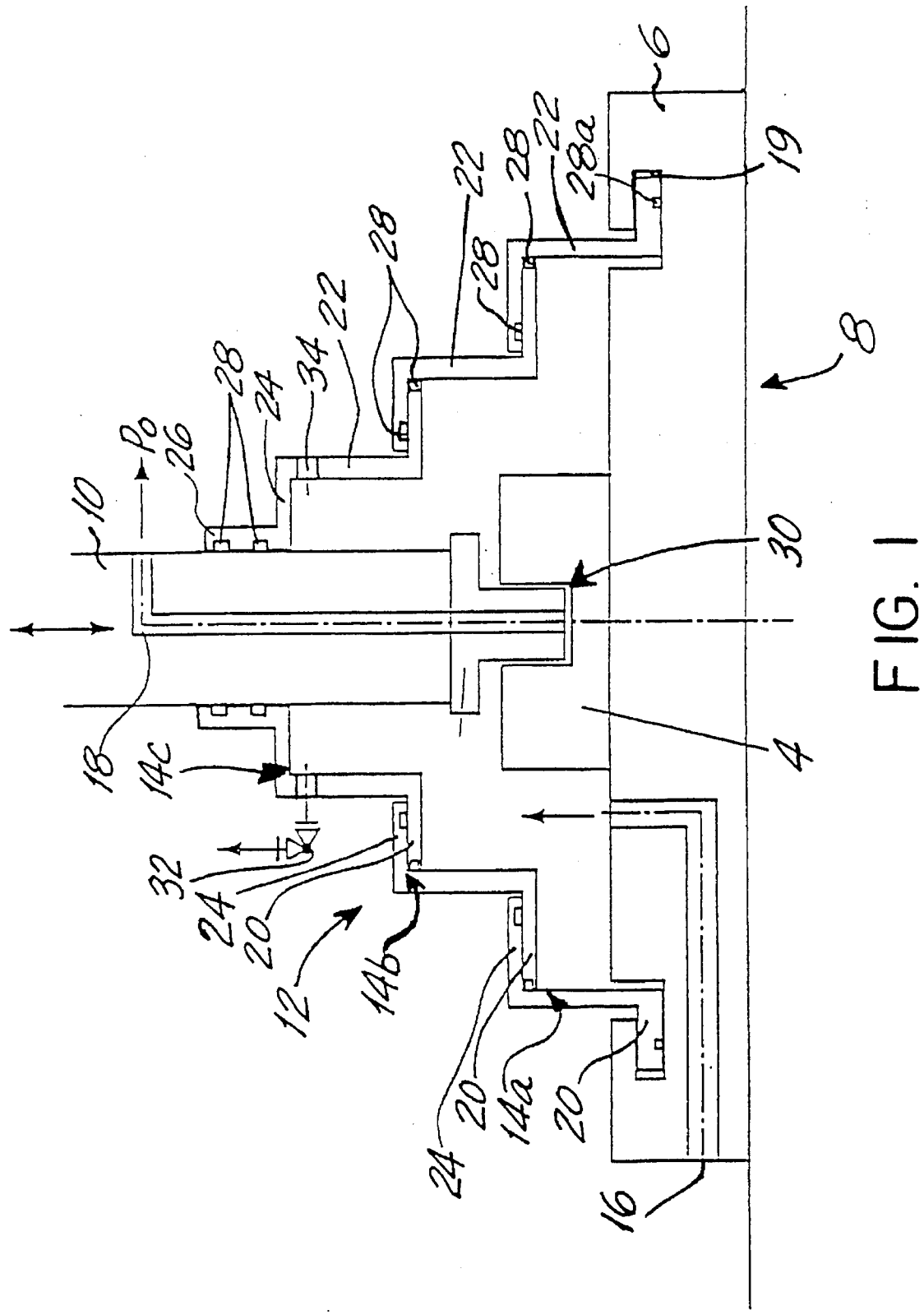
FIG. 1 is a schematic view of one embodiment of the invention with the dielectric container closed, FIG. 2 a schematic view of the embodiment illustrated in FIG. 1 with the container open, FIG. 3 a schematic view of another embodiment of the invention, FIG. 4 a schematic view of a third embodiment of the invention.

The embodiment illustrated in FIG. 1 will now be specified. The particular terminology employed is intended to facilitate reading the specification without restricting it in any way. The words "uppermost," "lowest," "innermost," and "outermost" relate to devices of conventional size in their conventional operating positions and to conventionally positioned work piece.

FIG. 1 is limited to illustration of the components of an electric-discharge device or machine in accordance with the present invention that are essential to the invention. Work piece 4 is electric-discharge machined with a die sinker 2. Work piece 4 is secured by a holder 6 that rests on a bench 8. Die sinker 2 is mounted on a sleeve 10 that moves in the directions indicated by double-headed arrow Z.

An entirely enclosed container 12 allows electric-discharge machining with a dielectric supplied and extracted subject to pressure. The container consists in essence of a work piece holder 6 and of three components 14a, 14b, and 14c that telescope together and apart. The top of container 12 is closed off by sleeve 10. The dielectric is supplied through a line 16 in holder 6 and extracted through a line 18 extending through die sinker 2 and sleeve 10.

Container 12 has two types of component that slide back and forth along each other within the meaning of the present invention. First, the upper half of the component is in the form of a telescoping arrangement, and the components 14 of the telescoping arrangement slide into and out of one another as the telescoping arrangement extends and collapses. Second, the telescoping arrangement is attached to the base or holder by means of rapid attachment in the form of bayonet fasteners. The bayonet fasteners engage and disengage one or more slots in holder 6 when lowest and outermost telescoping component 14a is lifted or lowered and rotated, meaning that the component slides along the holder.

Each telescoping component 14a, 14b, and 14c comprises at least an annular flange 20 extending radially outward, a cylindrical section 22 extending axially up from its inner edge, and another annular flange 24 extending radially in from the upper edge of the cylindrical section.

Another cylindrical section 26 extends axially up form the inner edge of the upper and radially inward annular flange 24 of the uppermost and innermost telescoping component 14c. Second cylindrical section 26 fits around sleeve 10 and component 14c slides up and down along the sleeve on the inner surface of the section. Due to the flanges on telescoping components 14a, 14b, and 14c the telescope is shaped like a terraced cone and the inside diameter at the top of the container equals the outside diameter of the sleeve. The number of telescoping components 14 can be varied in accordance with the dimensions of the overall device and also with those of work piece 4. The geometry of container 12 makes it possible to obtain and maintain the flow of dielectric through the operating gap 30 as constant as possible.

Telescoping components 14 are provided with insulating seals 28 at or near the inner and outer edges of the flanges. Seals 28 are positioned and designed to allow high enough pressure for effective machining to become established in container 12. One seal 28, seal 28a for instance, is secured by the bayonet fasteners as the attachment is established. Outer-edge seals 28 seal off the outer edge of the outer annular-disk shaped section 22 of a narrower telescoping component from the inner edge of the cylindrical section 24 of the next widest telescoping component.

Seals 28 are also designed to slide and allow the container to open and close in the Z direction without damage to the seals. Almost any desired pressure up to the maximal sustainable can be established in the chamber. The maximal difference between the pressure P in supply line 16 and the pressure Po in extraction line 18 is exerted at operating gap 30. The pressure against sleeve 10 is determined by the inside diameter of the innermost and uppermost telescoping component 14c and by the pressure prevailing in container 12.

A safety valve 32 in the wall of the cylindrical section 24 of innermost telescoping component 14c protects the container from too high internal pressure. A stopcock 34 in the same wall allows the gas to escape from the container. Finally, a throttle can be provided to allow adaptive adjustment of the pressure at the exit from the operating gap, to ensure controlled disruption of the eroding arc.

Figure 2:
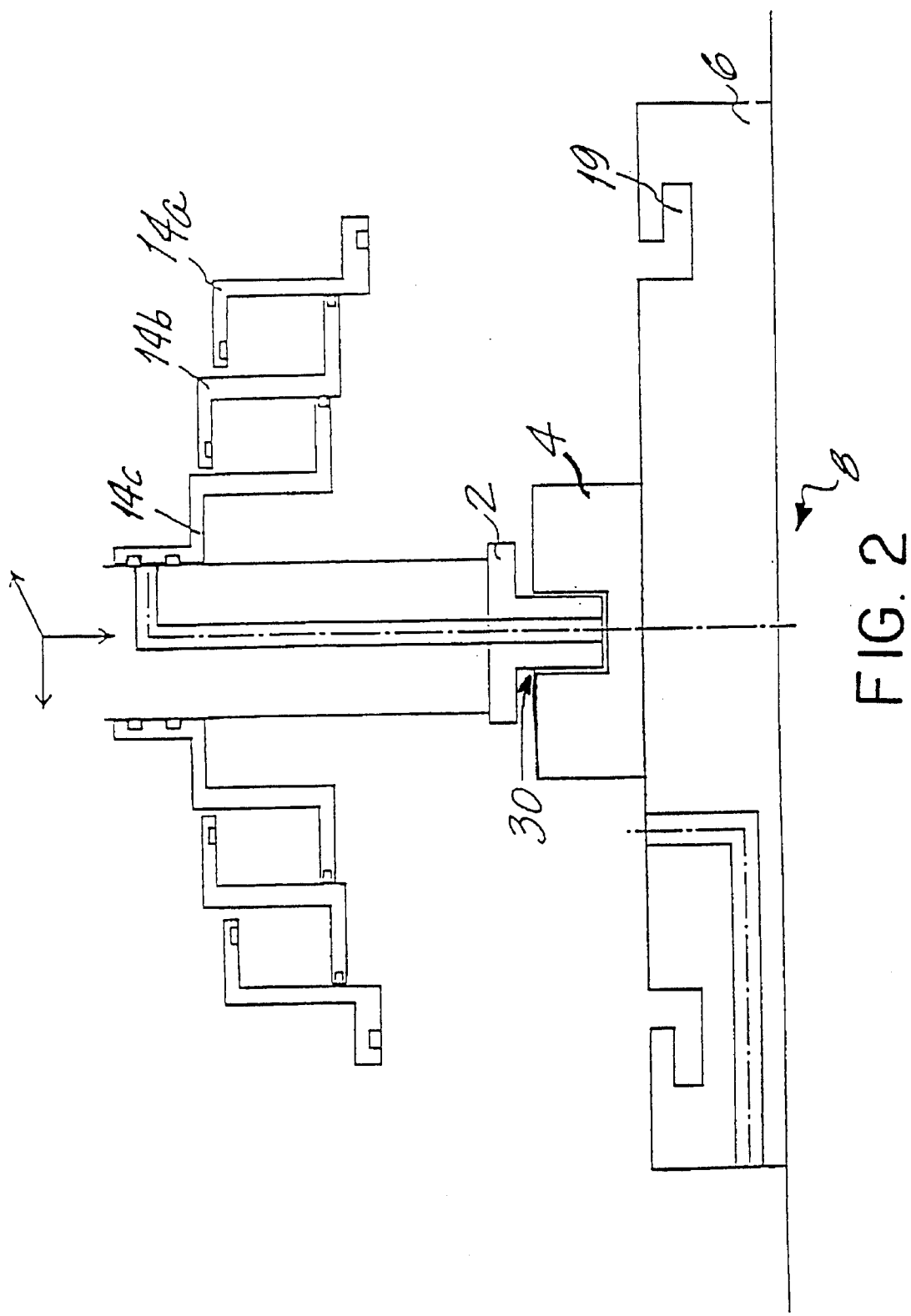

FIG. 2 illustrates the embodiment illustrated in FIG. 1 with container 12 open and slightly raised. With the container in this position it is possible to machine unimpededly along all the machine's axes. The dielectric can for example be conventionally employed as a bath in another container with its bottom constituted by bench 8 and with unillustrated sides. It is accordingly possible with the present invention to change rapidly over to conventional machining (e.g. planetary machining or machining along three axes without supplying the dielectric subject to pressure). This can be done just by extracting the dielectric from the container, releasing the bayonet fasteners, and collapsing the telescoping arrangement.

Figure 3:
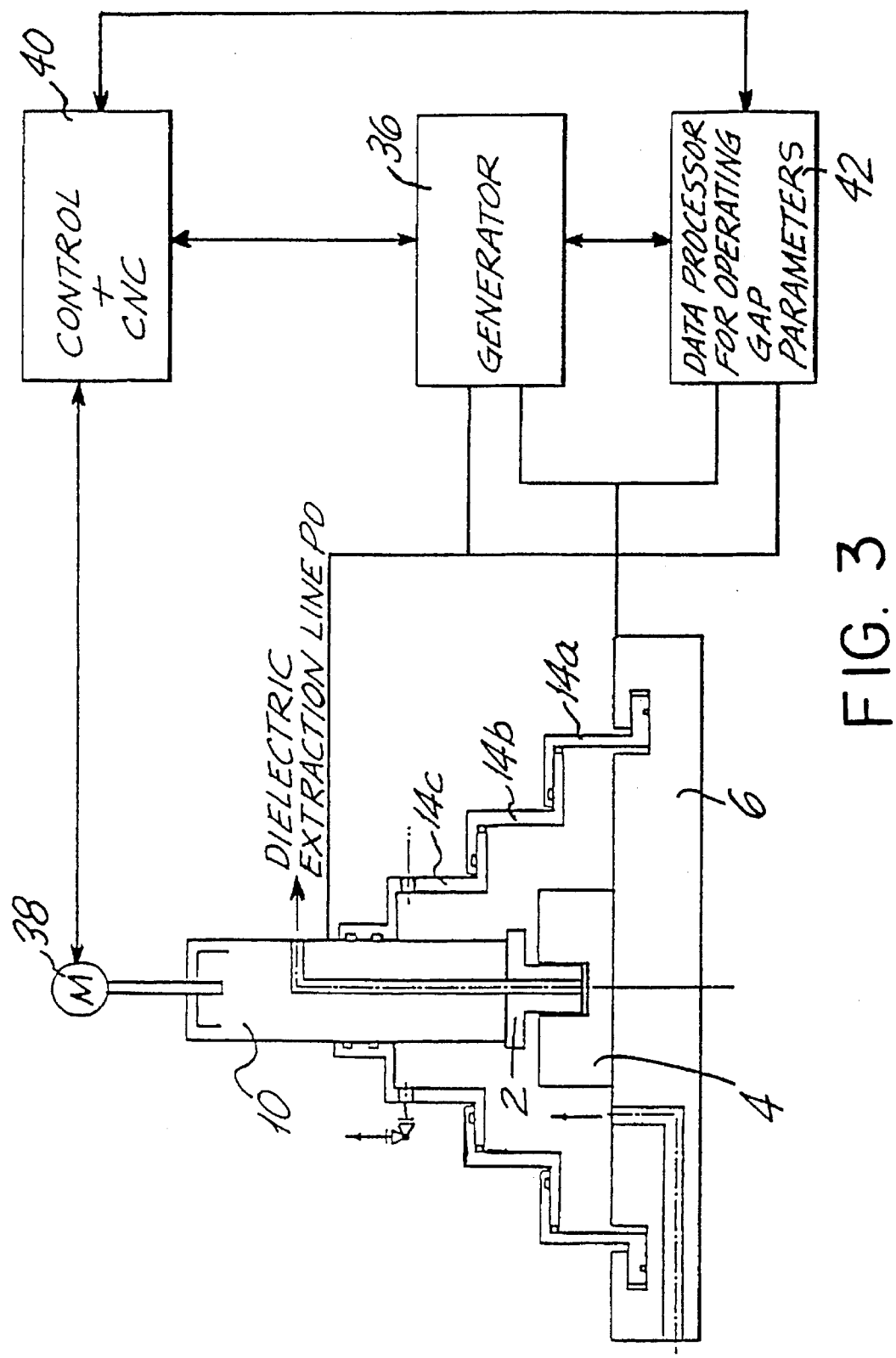
Figure 4:
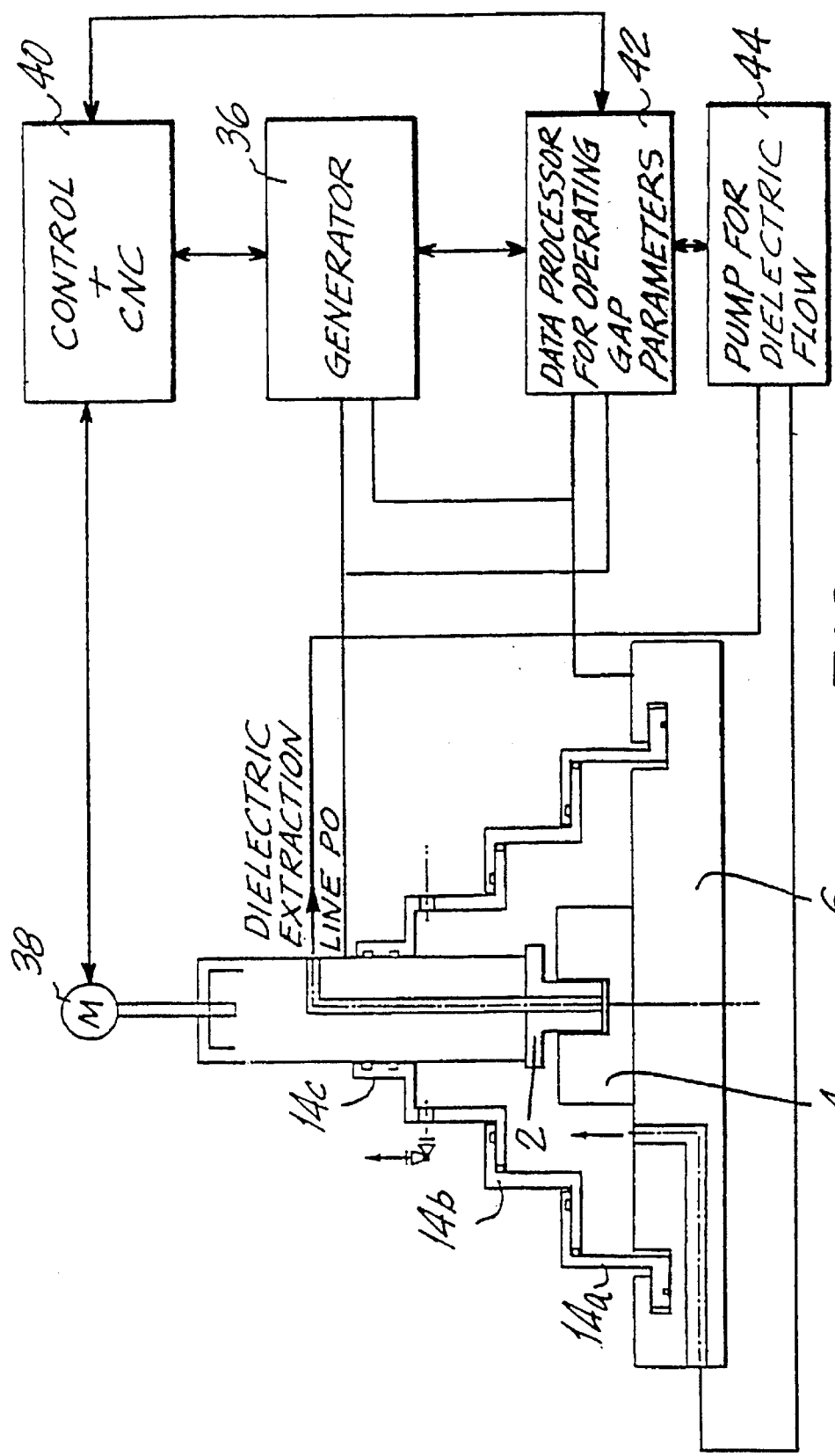
Figure 5A:
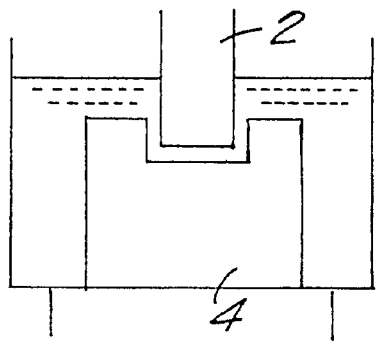
FIGS. 5a to e illustrate various electric-discharge devices with a pressurized container in accordance with the state of the art, and FIGS. 6a and b are further embodiments of the pressurized containers in accordance with the state of the art.
Figure 5B:
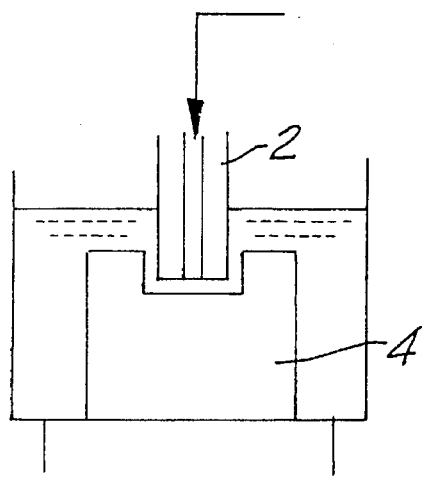
Figure 5C:
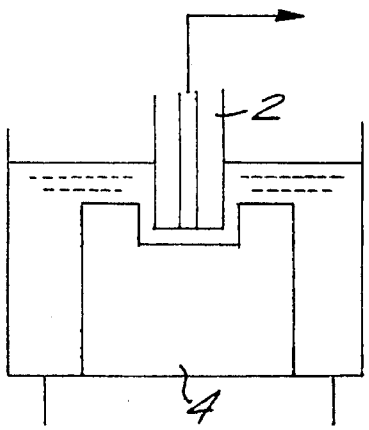
Figure 5D:
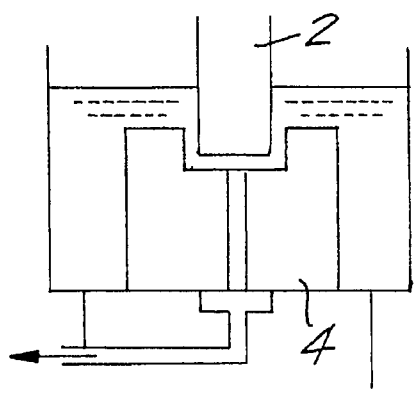
Figure 5E:
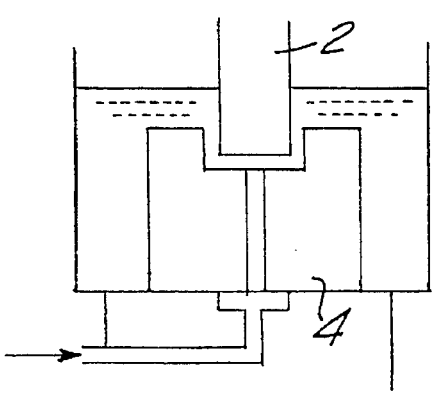
Figure 6A:
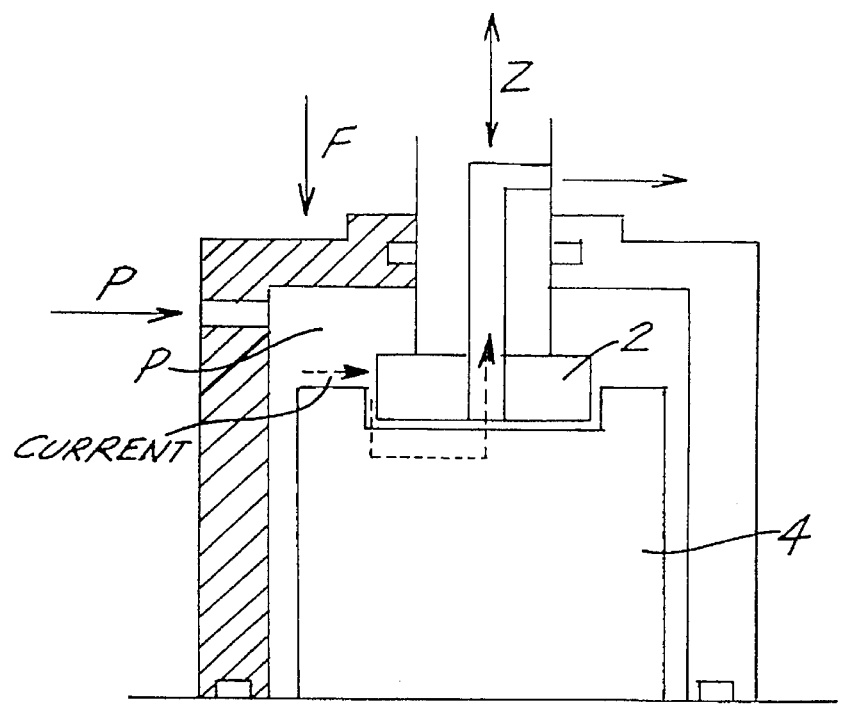
Figure 6B:
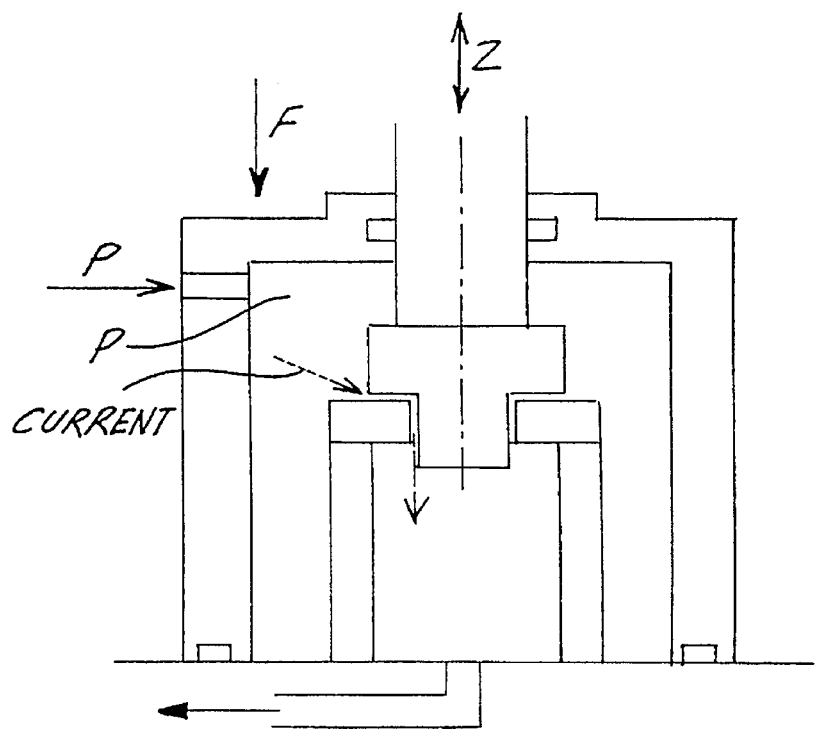

FIGS. 3 and 4 illustrate a pulse and/or current generator 36 connected to die sinker 2 and tensioning device 6. The tensioning device itself is electrically connected to work piece 4. A motor 38 on sleeve 10 allows die sinker 2 to be moved in the Z direction.

Motor 38 is coupled to a transmission integrated into computerized numerical controls (CNC) 40. Controls 40 themselves are connected to generator 36 and to a data processor 42 that detects operating-gap parameters and controls the machining. Data processor 42 is connected to generator 36 by a data-transmission line (represented by the arrow heads). The processor is also coupled to the power-supply lines between generator 36 and work piece 2 and tensioning device 6. The electric-discharge device accordingly features a switch employed to detect potential and current in operating gap 30. The switch itself is integrated into data processor 42, which can also detect and vary electrode advance and adapt the generator parameters in order to further optimize machining.

The device can be employed with practically any generator and any data processor. Additional important advantages are that the surfaces of the work piece and electrode can accommodate more electricity and that the operating gap can be smaller.

The device illustrated in FIG. 3 allows particularly constant rinsing conditions and is accordingly particularly appropriate for machining by the Ivanovic method (German 2 733 430 C2). This method employs a (direct-current) current generator instead of a pulse generator and a stationary arc for electric discharge, whereby the fluid flows through the gap at least 1 m/sec during preliminary machining and an order of magnitude more rapidly during final machining.

A dielectric pump 44 communicates with the data processor 42 illustrated in FIG. 4, and the dielectric can be supplied and extracted in accordance with the machining parameters. Data processor 42 is designed to determine electrode advance, to adapt the generator parameters, and in particular to optimize machining. The present invention can of course also be differently embodied if desired. An embodiment wherein the lowest telescope component is permanently secured to the base of the container and one or more telescoping components are mounted on the sleeve is conceivable. The lowest and outermost telescoping component and the base will in this event constitute the open container once the uppermost and innermost telescoping component has been introduced.

Also conceivable is an embodiment wherein bench 8 is exploited as the base of the container. Slots 19 and supply line 16 can in this event be provided in or integrated into the bench.

What is claimed is:

1. An apparatus for electric-discharge machining comprising
   a) an electrode;
   b) a sleeve for movably supporting the electrode;
   c) a container for enclosing a workpiece and holding a dielectric under pressure and which dielectric may be extracted and supplied under pressure;
   d) a holder for supporting the workpiece;
   said container comprises at least an upper cylindrical component and a lower cylindrical component, which upper cylindrical component is slidingly engaged with the sleeve and slidingly engaged with the lower cylindrical component, and wherein the lower cylindrical component is removeably attached to the holder.

2. The apparatus as in claim 1, wherein the holder is a bench.

3. The apparatus as in claim 1, wherein the container further comprises a middle cylindrical component, which is slideably disposed between the upper and the lower cylindrical component such that the upper, the middle and the lower cylindrical component may be telescopingly extendable or collapsible.

4. The apparatus as in claim 1, wherein the moveable attachment of the lower cylindrical component to the holder is a bayonet-shaped attachment.

5. The apparatus as in claim 3, wherein the upper, middle and lower cylindrical components each comprise a cylindrical section having a top end and a bottom end and a first flange extending radially outward at the bottom end and a second flange extending radially inward at the top end.

6. The apparatus as in claim 3, wherein the upper cylindrical component comprises a second cylindrical section attached to the second flange extending radially inward and which second cylindrical section fits slidingly around the sleeve.

7. The apparatus as in claim 6, further comprising at least one first seal between the second cylindrical section and the sleeve, at least one second seal between the outward flange of the upper cylindrical component and the inward flange of the middle cylindrical component, at least one third seal between the outward flange of the middle cylindrical component and the inward flange of the lower component and at least one fourth seal between the outward flange of the lower component and the holder.

8. The apparatus as in claim 7, further comprising a second seal disposed at an outer edge of the outward flange of the upper cylindrical component, a third seal disposed at an outer edge of the outward flange of the middle cylindrical component.

9. The apparatus as in claim 1, further comprising at least one of a safety valve and a stopcock for depressurizing the container, wherein the at least one of the safety valve and the stopcock is disposed in the upper cylindrical component.

10. The apparatus as in claim 1, wherein the workpiece is movably affixed such as to move the workpiece along a Z-direction.

11. The apparatus as in claim 1, further comprising one of a pulse generator and a current generator and a device for detecting voltage and current in a machining gap.

12. The apparatus as in claim 1, further comprising a processor control for determining positioning of the electrode and adjusting the parameters of a pulse generator for optimizing machining.

13. The apparatus as in claim 12, wherein the processor control has means for controllably adjusting and selecting the flow rate of the dielectric through a dielectric pump.

14. The apparatus as in claim 13, wherein the dielectric is supplied to and extracted from the container through an opening in the electrode.

15. The apparatus as in claim 12, further comprising a throttle for adjusting the pressure in a machining gap.

* * * * *